Feb. 28, 1928.
A. J. FAUSEK ET AL
1,660,328
WELDING AND CUTTING TORCH
Filed Jan. 7, 1927   3 Sheets-Sheet 2
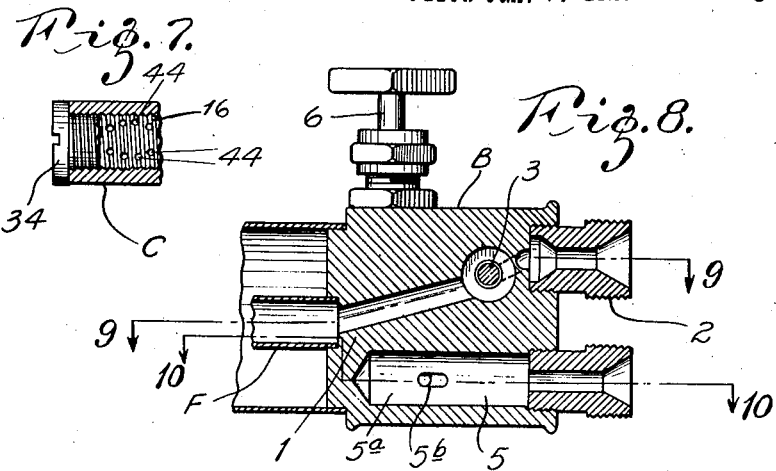
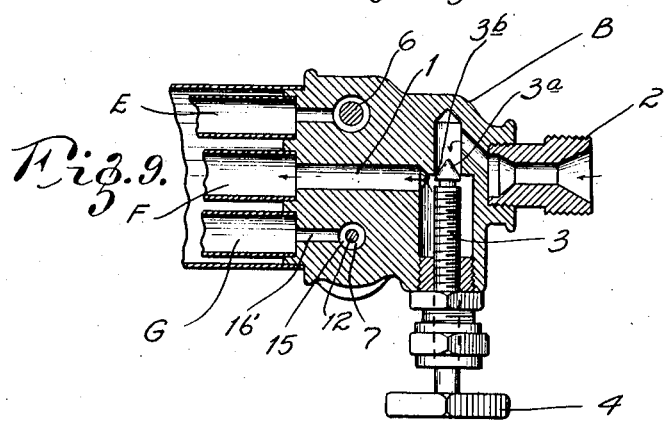
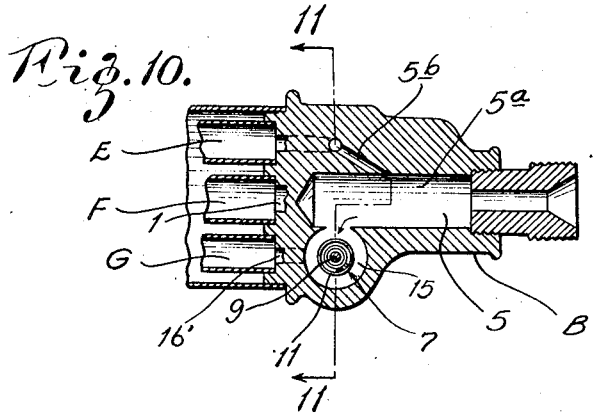
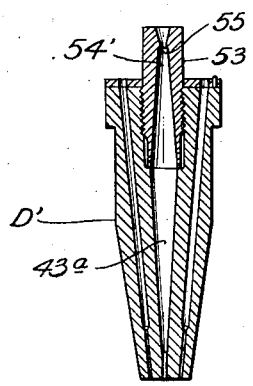
INVENTORS
ARTHUR J. FAUSEK.
IRWING F. FAUSEK.
BY Elliott & Harrington
ATTORNEYS

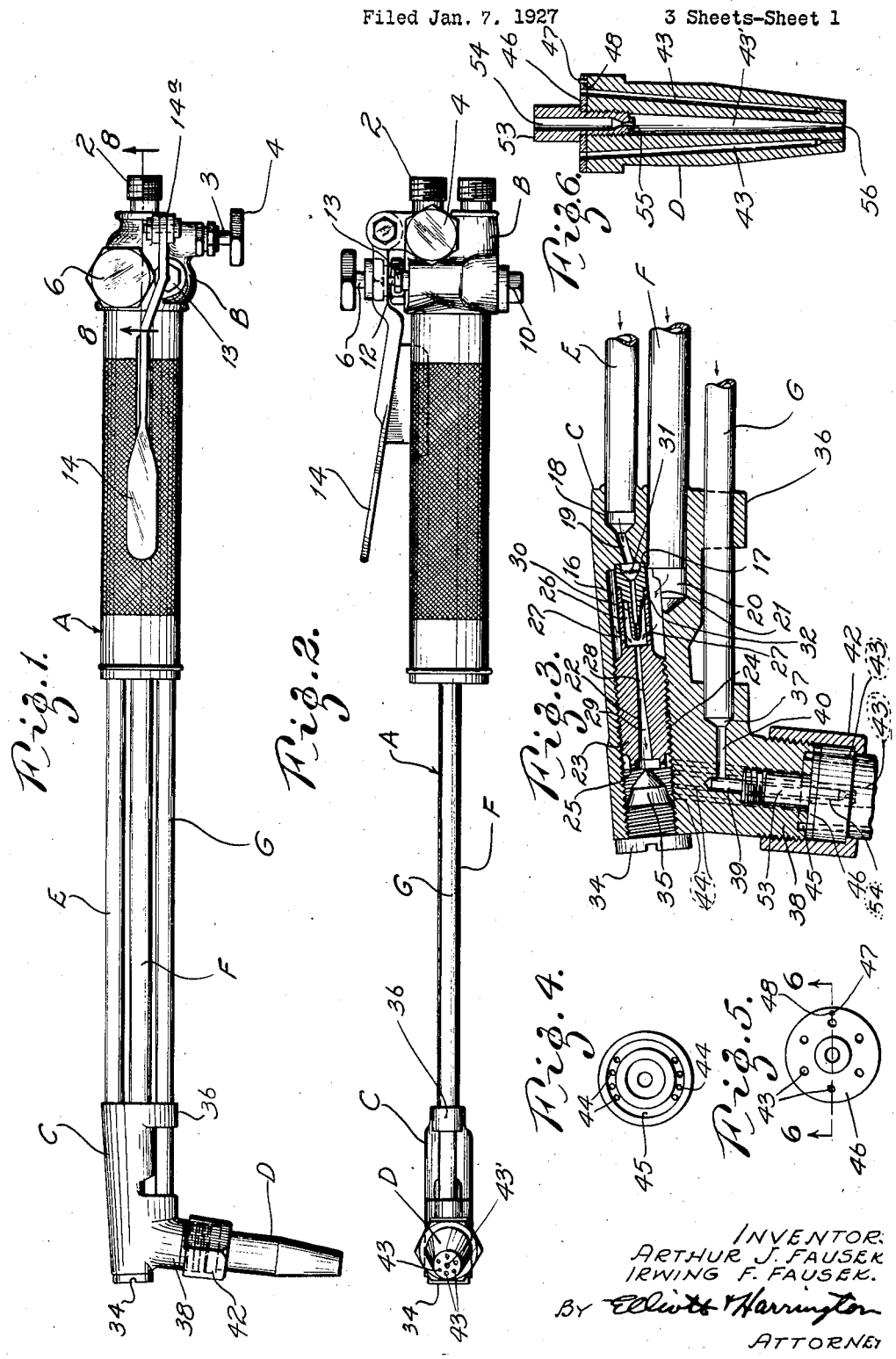

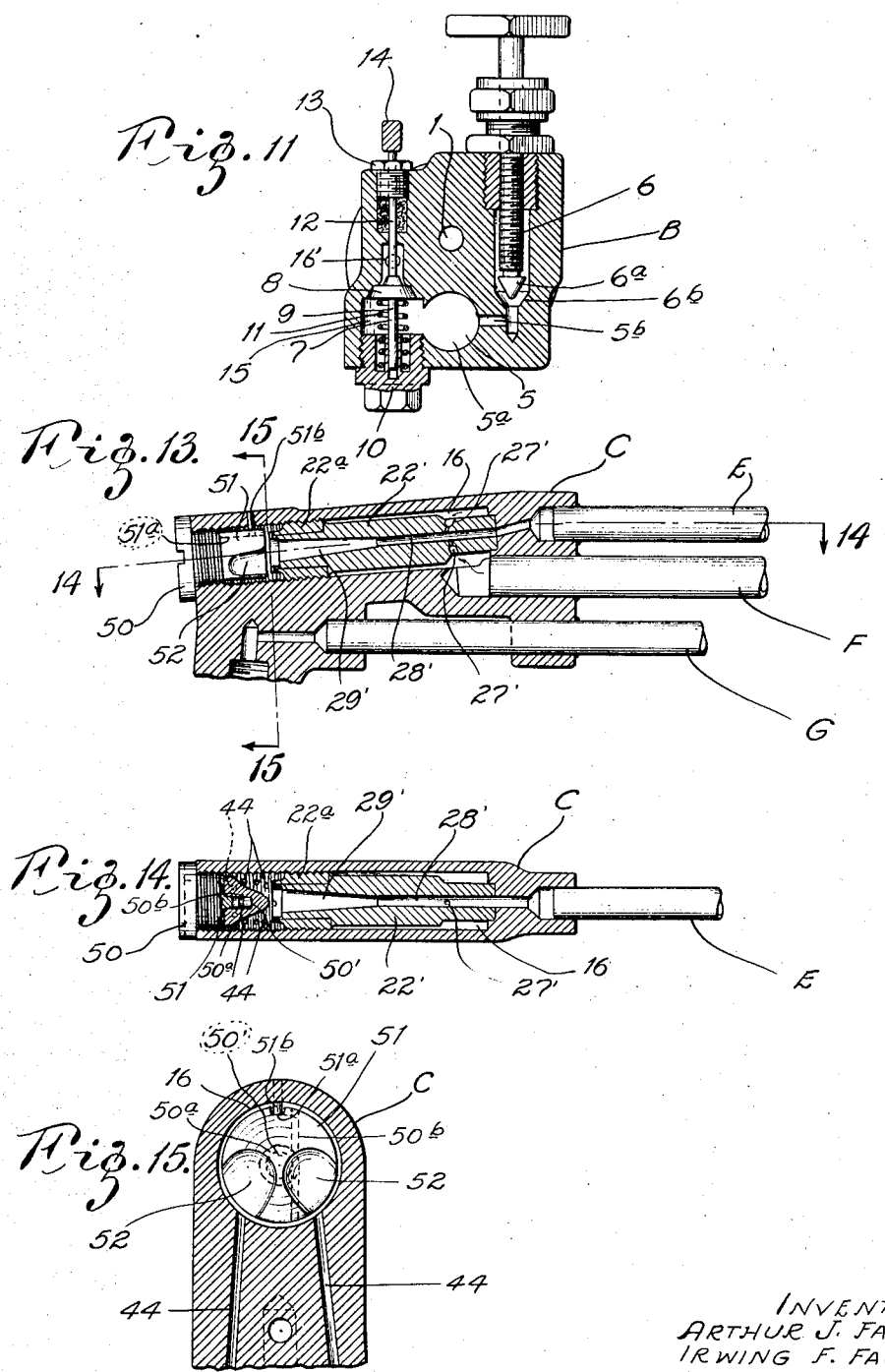

Patented Feb. 28, 1928.

1,660,328

UNITED STATES PATENT OFFICE.

ARTHUR J. FAUSEK AND IRWING F. FAUSEK, OF ST. LOUIS, MISSOURI.

WELDING AND CUTTING TORCH.

Application filed January 7, 1927. Serial No. 159,550.

This invention relates generally to welding and cutting torches and particularly to an improved torch adapted for use in burning gaseous mixtures for the purpose of welding and cutting metals, an important object of the invention being to produce a torch of the type described which is provided with a head wherein the mixing chamber of the torch is located.

A distinct advantage realized in connection with this arrangement over torch constructions heretofore employed arises from the fact that the mixing chamber of the torch comprises a separate element made in unitary cartridge form and therefore said mixing chamber may be inserted as a unit or removed as a unit from the head for the purpose of cleaning same without dismantling the torch, and also this arrangement permits of a wire or similar element being passed through the ports passing through the head of the torch whereby said ports may be conveniently kept clean of carbon and other accumulation.

Another important object of the invention is to produce an improved tip construction for torches of the class described, said construction being such that the gases are permitted to expand within the tip of the torch, whereby the velocity of the flow of gases at the discharge end of the tip is materially increased.

Another object of the invention is to produce a unique gasket arrangement for making the joint between the tip and the head of the torch fluid-proof.

Still another object of the invention is to produce a welding and cutting torch having a tail piece wherein ports and valves are arranged in a very convenient manner and in a manner to provide a relatively light element.

Figure 1 is an elevation of a cutting torch made in accordance with our invention;

Figure 2 is a plan view of the torch illustrated in Figure 1;

Figure 3 is an enlarged fragmentary section of the head portion of our improved torch and showing the mixing chamber arranged within said head portion, fragments of the fluid conductors and of the tip being associated with said head portion;

Figure 4 is an inverted plan view of the portion of the head of the torch to which the tip is attached;

Figure 5 is a plan view of a tip showing the gasket associated therewith;

Figure 6 is a vertical section of a tip taken on line 6—6 of Figure 5;

Figure 7 is a view of a fragment of the head of our improved torch showing the arrangement of the fluid passageways leading to the tip;

Figure 8 is a fragmentary vertical section on an enlarged scale illustrating the tail piece of the torch;

Figure 9 is a section on line 9—9 of Figure 8;

Figure 10 is a section on line 10—10 of Figure 8;

Figure 11 is a section on line 11—11 of Figure 10;

Figure 12 is a vertical section of a modified form of a tip used with our improved torch;

Figure 13 is a fragmentary section showing the type of mixing chamber which is employed in the head of our torch when the torch is used as a medium pressure instrument;

Figure 14 is a section on line 14—14 of Figure 13;

Figure 15 is a section on line 15—15 of Figure 13.

In the drawings, A designates our improved torch which comprises a tail piece B, a head C to which is attached a tip D, and a plurality of fluid conductors E, F and G which lead from the tail piece to the head. The torch A is also provided with a handle which is arranged adjacent to the tail piece B intermediate of said tail piece and the head C, said handle preferably being in the form of a tube through which the fluid conductors E, F and G pass.

Formed through the tail piece B is a fluid passageway 1 (Fig. 9) through which fuel gas passes during the operation of the torch. The fluid passageway 1 is in communication with the fluid conductor F, as shown clearly in the view mentioned, and said tail piece is provided with a screwthreaded nipple 2 which constitutes means whereby a flexible fluid conductor, such as a hose, may be attached to the tail piece in communication with the fluid passageway 1. 3 designates a valve adapted to control the passage of fuel gas through the passageway 1, said valve being operated to cause the valve head $3^a$ to be moved toward and away from the valve seat 3ᵇ by rotating the hand wheel 4 fixed to the valve stem and located at the side of the tail piece B.

Formed in the tail piece B is a second fluid passageway 5 through which, in the operation of the torch, oxygen passes. The oxygen passageway 5 comprises a straight portion 5ᵃ and an auxiliary passageway or branch 5ᵇ leading from the straight portion 5ᵃ to the fluid conductor E (Fig. 10). 6 designates a valve which is adapted to control the passage of oxygen through the branch passageway 5ᵇ and to the fluid conductor E, and 7 designates the valve mechanism whereby the passage of oxygen to the fluid conductor G, is controlled. The valve 6 just referred to resembles the valve 3 already described in construction and arrangement, said valve 6 having a head 6ᵃ which may be moved into and out of engagement with a valve seat 6ᵇ by rotating a hand wheel fixed to the valve stem. The valve mechanism 7, however, is quite different from the valve 6, said valve mechanism comprising a valve head 8 from which a stem 9 extends. The stem 9 is guided by a guideway forming a part of a plug 10 screwed into the tail piece B and a coil spring 11 is employed to force the valve head 8 against its seat. 12 designates a valve-operating rod which contacts with the valve head 8 and extends through a guiding plug 13 to a point above the tail piece B, as shown in Figs. 2 and 11. 14 designates a valve-operating arm pivoted at 14ᵃ to a pair of ears on the tail piece, said valve-operating arm being arranged in contact with the upper end of a valve-operating rod 12, as shown in Fig. 2. The valve mechanism 7 is located within an opening 15 and communication between the straight portion 5ᵃ of the passageway 5 and said opening 15 is effected by drilling the opening 15 of such diameter that the drill forming said opening will break through the wall of the fluid passageway 5 and thereby form communicating openings as shown in Fig. 10. When, in the operation of the torch, it is desired to cause oxygen to pass from the portion 5ᵃ of the fluid passageway 5 through the opening 15 and into the fluid conductor G, the pivoted valve-operating arm 14 is depressed at its outer end whereby the valve head 8 is unseated. The oxygen will then pass through the break in the wall of the passageway 5ᵃ and upwardly through the valve chamber 15 (Fig. 11), passing the valve head and into and through the passageway 16' to said fluid conductor G.

The torch illustrated in the drawings is a cutting torch and the oxygen which is controlled by the valve mechanism 7 and which passes through the conductor G constitutes the oxygen that forms the cutting jet of the torch. The oxygen which passes through the branch fluid passageway 5ᵇ and through the fluid conductor E to the head C of the torch is mixed with the fuel gas which passes through the fluid passageway 1 and the conductor F to produce a combustible mixture which is burned at the discharge end of the tip D. It is plain, in view of the foregoing, that the valves 3 and 6 may be adjusted to regulate the amounts of oxygen and fuel gas which pass to the head C whereby the mixture constituting the combustible may be regulated, and it is likewise plain that the flow of oxygen through the conductor G may be controlled by the valve mechanism 7 through the operation of the pivoted arm 14, said pivoted arm being so arranged that the operator may retain said arm in a depressed position to maintain the valve in an open condition by merely including the pivoted arm 14 in his grasp when he grips the torch at the handle thereof.

Formed in the head C of the torch approximately longitudinally thereof is a recess 16 provided with screwthreads adjacent to its outer open end. The recess 16 at the end opposite to the threaded end thereof is partially closed by a wall and a circular depression 17 is arranged in this wall (Fig. 3). 18 designates a recess in the head C, at the inner end thereof into which an end portion of the fluid conductor E extends, and 19 designates a fluid passageway which connects the recess 18 with the recess 16. Arranged in the head C below the recess 18 is an opening 20 into which an end portion of the fluid conductor F extends, the last mentioned opening being in communication with the recess 16, as shown at 21 in Figure 3.

Located within the recess 16 in the head C is a removable member 22 which provides the mixing chamber of our improved torch, said member comprising a main body portion 23 provided with externally arranged screwthreads 24 whereby said member may be screwed into the threaded portion of the recess 16 and said body portion being provided with a kerf 25 arranged at its outer end, whereby a screw-driver or similar tool may be employed to rotate the body portion of the member when it is being screwed into position within the recess 16. The rear end portion of the body portion 23 of the member 22 is reduced in diameter, as shown in Figure 3, so that an annular space is present between the outer face of said reduced portion and the wall of the recess 16, and a pocket 26 is arranged within said reduced portion. 27 designates apertures formed through the wall of the body portion 23 surrounding the pocket 26, whereby said pocket is placed in communication with the recess 16 in the head C. Formed longitudinally through the body portion 23 is a fluid passageway 28 having a tapering portion 29, said passageway constituting the mixing chamber and being in communication with the pocket 26 in the reduced portion of the body portion 23.

Arranged to extend into the pocket 26 is a nozzle 30 having a fluid passageway formed longitudinally therethrough which is in communication with the passageway 19 at the inner end of the head C, said fluid passageway in the nozzle having a portion of greater diameter at its rear end in which a screen 31 is arranged and the rear portion of said nozzle being seated in the circular depression 17 in the rear wall of the recess 16. The nozzle 30 is provided with a portion 32 of such diameter that it fits closely within but is removable from the rear end portion of the body portion 23 of the member 22, said portion 32 being of slightly less diameter than the rearmost portion of the nozzle, so that a shoulder is provided which contacts with the rearmost face of the body portion 23.

34 designates a plug which is screwed into the threaded end of the recess 16 in the head C, said plug being provided with a tapering portion 35 which is arranged in alinement with the fluid passageway 28 in the body portion 23 of the mixing chamber. In view of this arrangement of the plug 34, it is plain that a stream of fluid passing from the fluid passageway 28 would strike the tapered portion 35 of the plug and be divided thereby, portions of said stream passing to opposite sides of the tapered portion of the plug, and that the gas velocity will be maintained adjacent to said plug.

The head C of the torch is provided with a lug 36 which supports the fluid conductor G, and said head is also provided with a recess 37 into which the extreme end portion of said conductor G extends (Fig. 3). Also, the head C is provided with an extended portion 38 provided with screwthreads on its outer face at the end thereof, said extended portion having an opening 39 formed longitudinally therethrough. The opening 39 just referred to comprises a portion of relatively great diameter and a portion of less diameter, the portion of greater diameter being located at the outer end of the extended portion 38, and a fluid passageway 40 places said passageway 39 in communication with the opening 37 in which the fluid conductor G extends so that fluid may flow from said conductor G through said passageway 40 into the passageway 39.

The tip D, already referred to, is attached to the extended portion 38 of the torch by means of a suitable coupling device 42, said tip having a shoulder adjacent to its upper end which is engaged by a similar shoulder on the coupling device, whereby the tip is attached to said extended portion. The tip illustrated in the drawings is a cutting tip and is provided with a circular row of passageways 43 through which the combustible passes to the discharge end of the tip where said combustible is burned, and said tip also includes a centrally located passageway 43' formed longitudinally through the tip through which the oxygen which forms the cutting jet is passed. Formed in the head C is a plurality of fluid passageways 44, the upper open ends of which are arranged in the recess 16 at opposite sides of the tapered portion 35 of the plug 34. The lower face of the extended portion 38 of the head C is provided with an annular depression 45, as shown in Figures 3 and 4, and the lower ends of the fluid passageways 44 open into said annular depression, whereby said depression and the recess 16 are placed in communication with each other.

When the tip D is attached to the extended portion 38 of the head in the manner described, the circular row of passageways 43 in the tip opens into the annular depression 45. Hence, fluid which passes from the recess 16 through said passageways 44 will flow into said annular depression and from said depression will pass into and through the various passageways 43 to the discharge end of the tip where said fluid will be burned. It is, of course, necessary that the joint between the tip and the portion 38 of the head be fluid-tight, and we therefore employ a gasket 46 which is provided with openings formed therethrough corresponding in size and location with the upper ends of the fluid passageways 43 in the tip. It is, of course, necessary that the openings in the gasket register with the upper ends of the passageways 43 in the tip, and to insure this registration, we employ a pin 47 which extends from the upper face of the tip. The gasket is provided with an opening 48 through which the pin 47 extends, and it is plain that when the pin is passed through the opening 48 in the gasket, the other openings will register with the upper ends of the fluid passageways 43 in the tip.

In Figure 3, we have illustrated a low pressure mixing chamber which includes a nozzle 30, but at times it may be desired to employ a medium pressure mixing chamber such as that illustrated in Figures 13 and 14. The mixing chamber shown in the views mentioned is similar to the mixing chamber shown in Figure 3, excepting that no nozzle is included as a part of the first mentioned mixing chamber. The medium pressure mixing chamber comprises a member 22' provided with a fluid passageway 28' having a tapered portion 29', and said mixing chamber is also provided with apertures 27' formed through the wall thereof to place the fluid passageway 28' in communication with the recess 16 of the head of the torch. The member 22' is provided with a reduced portion at the front thereof which extends into a screwthreaded ring 22ª, the joint between the member 22' and the ring 22ª being a slip joint so that the ring may rotate with respect to the member 22' whereby removal of the mixing chamber is made easier than if it were necessary to rotate the entire mixing chamber to remove same.

In Figures 13, 14 and 15, a form of plug is shown which differs slightly from the plug illustrated in Figure 3. The plug shown in Figures 13, 14 and 15 comprises a member 50 adapted to be screwed into the threaded end of the recess 16 and having a pin 50' extended therefrom, as shown in Figure 14. Mounted on the pin 50' so that said pin may rotate with respect thereto is a plug portion 51 provided with a pair of oppositely disposed depressions 52 which, when the plug 50 is in position in the head of the torch, are so arranged that the fluid passageways 44 in the head C open into said depressions, as shown in Figure 15. The walls of the depressions 52 are so shaped that they provide the plug with a plug portion having divergent faces, said plug portion being adapted to divide the flow of fluid from the fluid passageway in the mixing chamber and direct portions of said stream of fluid towards opposite sides of the plug portion 51, whereby said portions of the stream of fluid will pass into and through the fluid passageways 44 to the tip D. The plug portion 51 is provided with a slot 51ª extended longitudinally at the top thereof, and 51ᵇ designates a pin supported by the torch head and extended into said slot as shown in Fig. 15. In view of this arrangement and because the pin 50' may rotate relative to the plug portion 51, it is obvious that the member 50 of the plug may be screwed into the threaded end of the recess 16 of the torch head without imparting rotary movement to the plug portion 51, and therefore the cooperation of the slot 51ª and the pin 51ᵇ will insure proper positioning of the depressions 52 with respect to the upper ends of the fluid passageways 44. To permit the pin 50' to rotate with respect to the plug portion 51, we provide said pin 50' with an annular groove 50ª and pass a pin 50ᵇ through the plug portion 51 in such manner that it passes through a portion of said annular groove 50ª, whereby said plug portion may rotate with respect to the pin 50' but may not move longitudinally with respect thereto.

The tip illustrated in Figure 6 is provided with screw-threads at the upper end of the passageway 43', and 53 designates a stem which is screwed into said threaded portion of said opening. The stem 53 functions as a means for preventing lateral movement of the gasket with respect to the top face of the tip and also is provided with a shoulder which clamps the gasket in place, said gasket having a central opening formed therethrough through which said stem extends, and the wall of the opening contacting with the outer face of the stem to prevent the lateral movement described. The stem 53 is provided with a fluid passageway 54 formed longitudinally therethrough, said fluid passageway being provided with a restricted portion 55 at its lower end, and as clearly shown in Figure 6, the passageway 43' is of greater area than said restricted portion 55 of the fluid passageway in the stem. The passageway 43' is preferably tapered slightly and is provided with a restricted portion 56 at its lower end.

In the use of a tip constructed as shown in Figure 6, the fluid passes from the passageway 39 into and through the passageway 54 in the stem 53, which stem, as shown clearly in Figure 3, extends into the passageway 39. The fluid then passes through the restricted portion 55 of the passageway 54 in the stem and into the passageway 43'. When the fluid passes from the restricted portion 55 of the passageway 54 into the passageway 43', said fluid will immediately expand within said passageway 43' and as a consequence, its velocity of flow at the discharge end of the tip will be greatly increased, thereby increasing the effectiveness of the cutting jet.

The tip shown in Figure 12 is a modified form of the tip shown in Figure 6, the differences being that the fluid passageway 43ª is provided with a greater taper than is the passageway 43' in Figure 6. Also, the passageway 54' in the stem 53' is tapered and the restricted portion 55' of said passageway in the stem is at the upper end of said stem instead of at the lower end thereof, as in Figure 6. The action of the fluid passing through the tip D', shown in Figure 12, is exactly like that described in connection with Figure 6, the fluid passing through the restricted portion 55' of the passageway in the stem 53' into the passageway 43ª formed by the tapered passageways in the tip and stem, and because of the greater area of the passageway 43ª, the fluid will expand upon entering said passageway 43ª, whereby the velocity of flow of the fluid is increased at the discharge end of the tip.

An important feature of the present invention resides in the particular arrangement of the fluid passageways in the tail piece B of the torch. By referring to Figures 8, 9 and 10 it will be noted that the interior fluid passageways are so arranged that it is not necessary to drill through the wall of the tail piece to form said passageways and thereafter plug the hole in the wall of the tail piece through which the drilling was done. For instance, the passageway 1 may be formed by drilling through from the forward face of the tail piece into the opening in which the valve 3 is located, as shown in Figure 9, the angle of said passageway being such that a portion only thereof opens into the opening referred to. The portion of the passageway 1 between the opening for the valve 3 and the rear end of the tail piece is formed by drilling through from the rear end of the tail piece into said valve opening. Also, the opening 15 for the valve mechanism 7 is arranged in communication with the fluid passageway 5 by drilling said opening 15 of such diameter that it will break through the wall of the passageway 5. In like manner, all of the passageways are formed to avoid drilling through the wall of the tail piece and therefore the plugs mentioned above are eliminated. Also, with respect to the fluid passageways in the tail piece B, and particularly to the oxygen passageway 5, it is pointed out that the portion 5ª of said oxygen passageway is straight, as shown in Fig. 10, so that there will be no likelihood that the free flow of oxygen through said passageway portion 5ª will be interfered with. In addition to the foregoing, it will be noted from the view mentioned that the portion 5ª of the oxygen passageway is of considerably greater diameter than the passageways which lead from said portion 5ª to the fluid conductors E and G, respectively, and also that the passageways leading to the fluid conductors E and G open into the portion 5ª of the oxygen passageway at the opposite sides thereof. As a result of this arrangement, the required amount of oxygen always passes into the conductors E and G, as there is no tendency for one branch passageway associated with the oxygen passageway to rob the other branch passageway of oxygen.

We claim:

1. A torch of the class described comprising a head having an opening formed therein, a tip attached to said head, conductors adapted to conduct fluid to said head, a nozzle located within the opening in said head at an end thereof and in communication with one of said conductors, a closure member at the opposite end of said opening adapted to close same, and a removable member providing a mixing chamber interposed between said nozzle and said closure member, said member being removable from said head through the end of the opening therein closed by said closure member, said nozzle being arranged to eject fluid from one of said conductors into the mixing chamber provided by said member, and said mixing chamber being in communication with another of said conductors, whereby fluid from a plurality of conductors is commingled within said mixing chamber to produce a combustible mixture.

2. A torch of the class described comprising a head having an opening formed therein, a tip attached to said head, conductors adapted to conduct fluid to said head, a nozzle located within the opening in said head at an end thereof and in communication with one of said conductors, a closure member at the opposite end of said opening adapted to close same, and a removable member providing a mixing chamber interposed between said nozzle and said closure member, said member being removable from said head through the end of the opening therein closed by said closure member, said nozzle being arranged to eject fluid from one of said conductors into the mixing chamber provided by said member, and said mixing chamber being in communication with another of said conductors, whereby fluid from a plurality of conductors is commingled within said mixing chamber to produce a combustible mixture, said opening in said head being arranged at an angle to the axis of said tip whereby said closure member and the member providing the mixing chamber may be removed from the torch without necessitating removal of the tip.

3. A torch of the class described comprising a head having an opening formed therein, a tip attached to said head, conductors adapted to conduct fluid to said head, a nozzle located within said opening in said head at an end thereof and in communication with one of said conductors, a closure member at the opposite end of said opening adapted to close same, a member providing a mixing chamber interposed between said nozzle and said closure member, said member being provided with a hollow portion communicating with the mixing chamber into which a portion of said nozzle extends and the wall of said hollow portion being provided with an aperture whereby the mixing chamber is in communication with a second conductor, said nozzle being arranged to eject fluid from one of said conductors into the hollow portion of said member, and fluid from another conductor being drawn through said aperture in the wall of said hollow portion, whereby said fluids are commingled within the mixing chamber to produce a combustible mixture.

4. A torch of the class described comprising a head having a threaded opening formed therein, a tip attached to said head, conductors adapted to conduct fluid to said head, a nozzle located within said opening in said head at an end thereof and in communication with one of said conductors, a closure member at the opposite end of said opening adapted to close same, and a member providing a mixing chamber interposed between said nozzle and said closure member, said member being provided with a hollow portion into which a portion of said nozzle is extended, and an end of said nozzle being forced into firm contact with a wall of said opening by said member to provide a fluid-tight joint at that point, said nozzle being arranged to eject fluid from one of said conductors into the mixing chamber provided by said member, and said mixing chamber being in communication with another of said conductors whereby fluids from a plurality of conductors are commingled within the mixing chamber to produce a combustible mixture.

5. A torch of the class described comprising a head having an opening formed therein, a tip attached to said head, conductors adapted to conduct fluid to said head, a removable member located within said opening in said head and providing a mixing chamber, said mixing chamber being in communication with a plurality of fluid conductors and fluids from said conductors being commingled within said mixing chamber to produce a combustible mixture, and a plug at an end of said opening in said head and adapted to close said opening to prevent escape of fluid at that point, said plug being located so that fluid discharged from said mixing chamber is directed against same and being shaped to divide the stream of fluid passing from the mixing chamber and direct portions of said stream to opposite sides thereof and said removable member being removable from said head through the end of the opening therein closed by said plug.

6. A torch of the class described comprising a head having an opening formed therein, a tip attached to said head, conductors adapted to conduct fluid to said head, a removable member located within said opening in said head and providing a mixing chamber, said mixing chamber being in communication with a plurality of fluid conductors and fluids from said conductors being commingled within said mixing chamber to produce a combustible mixture, and a plug at an end of said opening in said head and adapted to close same to prevent escape of fluid at that point, said plug being located so that fluid discharged from said mixing chamber is directed against same and having oppositely-disposed divergent faces adapted to divide the stream of fluid passing from the mixing chamber and direct portions of said stream to opposite sides of said plug and said removable member being removable from said head through the end of the opening therein closed by said plug.

7. A torch of the class described comprising a head having an opening formed therein, a tip attached to said head, conductors adapted to conduct fluid to said head, a member located within said opening in said head providing a mixing chamber, said mixing chamber being in communication with a plurality of fluid conductors and fluids from said conductors being commingled within said mixing chamber to produce a combustible mixture, and a plug at an end of said opening in said head adapted to close said opening and prevent escape of fluid at that point, said plug being located so that fluid discharged from said mixing chamber is directed against same and being provided with oppositely-disposed depressions having faces adapted to divide the stream of fluid passing from the mixing chamber and direct portions of said stream to opposite sides of said plug, a portion of said plug being movable with respect to another portion thereof to provide for proper positioning of said depressions within said head.

8. A torch of the class described comprising a head having an opening formed therein, a tip attached to said head, conductors adapted to conduct fluid to said head, a member located within said opening in said head and providing a mixing chamber, said mixing chamber being in communication with a plurality of fluid conductors and fluids from said conductors being commingled within said mixing chamber to provide a combustible mixture, a plug at an end of said opening in said head adapted to close said opening to prevent escape of fluid at that point, said plug being located so that fluid discharged from said mixing chamber is directed against same and being provided with opposite-disposed depressions having faces adapted to divide the stream of fluid passing from the mixing chamber and direct portions of said stream to opposite sides of said plug, a portion of said plug being movable with respect to another portion thereof to provide for the proper positioning of said depressions within the head, and means associated with said head adapted to compel proper positioning of said depressions within the head.

9. A torch of the class described comprising a head having an opening formed therein, a tip attached to said head, conductors adapted to conduct fluid to said head, a nozzle located within said opening in said head at an end thereof and in communication with one of said conductors, a closure member at the opposite end of said opening adapted to close same, a member providing a mixing chamber interposed between said nozzle and said closure member, said member being provided with a hollow portion communicating with said mixing chamber into which a portion of said nozzle extends and the wall of said hollow portion being provided with an aperture whereby the mixing chamber is in communication with a second conductor, said nozzle being arranged to eject fluid from one of said conductors into said hollow portion of said member, and fluid from another conductor being drawn through said aperture in the wall of said hollow portion whereby said fluids are commingled within the mixing chamber to produce a combustible mixture, said closure member being located so that fluid discharged from said mixing chamber will be directed against same and said closure member being provided with a portion shaped to divide the stream of fluid passing from the mixing chamber and direct portions of said stream of fluid to the opposite sides of the closure member, said opening in said head being arranged at an angle to the axis of said tip, whereby the closure member and the member providing the mixing chamber may be removed from the torch without necessitating removal of said tip.

10. A torch of the class described comprising a head having an opening formed therein, a tip attached to said head, conductors adapted to conduct fluid to said head, one of said conductors being in communication with said opening in said head at an end thereof, a closure member at the end of said opening opposite to the end thereof at which the last mentioned conductor communicates therewith, and a removable member providing a mixing chamber interposed between the end of said opening at which said last mentioned conductor communicates therewith and the end of said opening closed by said closure member, said last mentioned conductor being arranged to eject fluid into the mixing chamber provided by said removable member, and said mixing chamber being in communication with another of said conductors whereby fluid from a plurality of conductors is commingled within said mixing chamber to produce a combustible mixture, said removable member being removable from said head through the end of the opening therein closed by said closure member.

In testimony whereof, we have hereunto set our hands.

ARTHUR J. FAUSEK.
IRWING F. FAUSEK.